US012808351B2

(12) United States Patent
Lipka

(10) Patent No.: US 12,808,351 B2
(45) Date of Patent: Nov. 24, 2026

(54) HEATING ELEMENT FOR A WIND TURBINE ROTOR BLADE

(71) Applicant: Nordex Energy SE & Co. KG, Hamburg (DE)

(72) Inventor: Thomas Lipka, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 19/329,278

(22) Filed: Sep. 15, 2025

(65) Prior Publication Data

US 2026/0078735 A1 Mar. 19, 2026

(30) Foreign Application Priority Data

Sep. 16, 2024 (EP) .................................... 24200525

(51) Int. Cl.

*F03D 1/06* (2006.01)
*F03D 80/40* (2016.01)
*F03D 80/60* (2016.01)

(52) U.S. Cl.

CPC ......... *F03D 1/0688* (2023.08); *F03D 80/401* (2023.08); *F03D 80/60* (2016.05); *F05B 2240/303* (2020.08); *H05B 2214/02* (2013.01)

(58) Field of Classification Search

CPC ...... F03D 1/0688; F03D 80/401; F03D 80/60; H05B 2214/02

See application file for complete search history.

(56) References Cited

U.S. PATENT DOCUMENTS

| | | | | |
|---|---|---|---|---|
| 11,542,922 | B2 * | 1/2023 | Wood | F03D 80/60 |
| 2018/0054859 | A1 | 2/2018 | Picard et al. | |
| 2020/0232445 | A1 | 7/2020 | Lindskog | |
| 2023/0067244 | A1 * | 3/2023 | Dharmadhikari | F03D 17/028 |

FOREIGN PATENT DOCUMENTS

| | | |
|---|---|---|
| EP | 2 843 228 A1 | 3/2015 |
| EP | 3 604 795 A1 | 2/2020 |

OTHER PUBLICATIONS

Lipka, EP2843228A1 English Translation, 2015 (Year: 2015).*

Extended search report of the European Patent Office dated Feb. 20, 2025 in European patent application No. 24200525.4 on which the claim of priority is based.

* cited by examiner

*Primary Examiner* — Michael L Sehn

(74) *Attorney, Agent, or Firm* — Walter Ottesen, P.A.

(57) ABSTRACT

A heating element for a wind turbine rotor blade including: two electrical connectors adapted to be connected to electrical supply lines of the wind turbine rotor blade, and a defined geometry configured to be arranged on a specified surface area of the wind turbine rotor blade. The heating element is provided with a position indicator adapted to be aligned with a leading edge of the wind turbine rotor blade.

15 Claims, 3 Drawing Sheets

HEATING ELEMENT FOR A WIND TURBINE ROTOR BLADE

CROSS-REFERENCE TO RELATED APPLICATIONS

This application claims priority of European patent application no. 24200525.4, filed Sep. 16, 2024, the entire content of which is incorporated herein by reference.

TECHNICAL FIELD

The disclosure relates to a heating element for a wind turbine rotor blade.

BACKGROUND

EP 2 843 228 A1 discloses a wind turbine rotor blade with an electrical heating system including a plurality of electrical heating elements arranged on an outer surface of a wind turbine rotor blade. Each of the heating elements has a carrier layer and a heating conductor arranged on the carrier layer between two opposite edges of the heating element in a meandering pattern. The heating elements can be manufactured as flexible preforms having different shapes adapted to the respective surface areas of the wind turbine rotor blade that shall be heated. These preforms are arranged in position, adhered to the outer surface of the wind turbine rotor blade and connected to electrical supply lines.

SUMMARY

It is an object of the disclosure to provide a heating element for a wind turbine rotor blade that is easier to install.

This object is, for example, achieved by a heating element for a wind turbine rotor blade according to various embodiments of the disclosure.

A heating element for a wind turbine rotor blade has:

- two electrical connectors adapted to be connected to electrical supply lines of the wind turbine rotor blade, and
- a defined geometry configured to be arranged on a specified surface area of the wind turbine rotor blade, wherein
- the heating element is provided with a position indicator adapted to be aligned with a leading edge of the wind turbine rotor blade.

The heating element has a defined geometry. When arranged on the wind turbine rotor blade, the surface area of the turbine rotor blade covered by the heating element can be heated by a heating current supplied via the electrical supply lines of the wind turbine rotor blade which are connected to the two electrical connectors. The heating current then flows through the heating element so that the heating element and the surface area covered by the heating element is heated in order to remove accumulated ice and/or in order to prevent the formation of ice on this surface area.

The heating element of the disclosure is provided with a position indicator adapted to be aligned with a leading edge of the wind turbine rotor blade. The position indicator may be shaped as a straight line that can be aligned with a leading edge along its entire length. However, it is also possible to use at least two smaller markings such as line segments, crosses or points which can easily be aligned each with the leading edge. The position indicator enables the positioning of the heating element at the specified surface area of the wind turbine rotor blade when mounting the heating element to the wind turbine rotor blade.

When configuring a heating system for a wind turbine rotor blade, the requirements are defined in the configuration phase taking into account the expected operating conditions of the wind turbine rotor blade. The surface area to be heated by each heating element is specified, including the geometry of the heating element and the required heating power. Mounting the heating element in the correct position is important to obtain the desired heating effect. Any errors in positioning of the heating element may lead to either accumulation of ice in areas receiving insufficient heating power or overheating and waste of energy in areas receiving more than the required heating power.

At the time of mounting the heating element on the wind turbine rotor blade, arranging the heating element in a desired position is challenging, because the heating element is relatively large and flexible, and the surface area of the wind turbine rotor blade where the heating element needs to be placed is difficult to identify because of the size of the wind turbine rotor blade and the complex curvature of its surface.

In the field of wind turbine rotor blade manufacturing, it is known to indicate a desired position via a laser projection system. For example, a laser projection system may indicate the desired position of a layer of reinforcement material within a mold for a wind turbine rotor blade half shell. The reinforcement material can then be placed exactly at the position indicated by the laser projection system. This positioning technique, however, is complicated and requires a precise referencing of the laser projection system with regard to the wind turbine rotor blade half shell. Usually, reference markers on the wind turbine rotor blade half shell mold are identified with the laser projection system to acquire a reference. This is a complex process and cannot be applied to mounting of heating elements to an outer surface of a wind turbine rotor blade which has already been demolded, or when an existing wind turbine rotor blade shall be retrofitted with a heating system.

The disclosure provides a much simpler solution. It uses the leading edge of the wind turbine rotor blade as a reference on the wind turbine rotor blade. The leading edge can usually be identified visually as an adhesive bond line between wind turbine rotor blade shell members. For the purpose of this disclosure, it does not matter whether this leading edge exactly coincides with a leading edge of the wind turbine rotor blade defined more precisely in aerodynamic terms.

Based on the visual identification of the leading edge, it is easy to align the position indicator of the heating element with the leading edge, and to thereby arrange the heating element at the specified surface area. If at all, it may be necessary to place the heating element at the desired position with regard to the longitudinal axis of the wind turbine rotor blade, which can easily be done by, for example, measuring a distance from a wind turbine rotor blade tip along the leading edge. The much more difficult positioning of the heating element in a direction perpendicular to the leading edge, essentially along the profile chord, and the relative angle between the heating element and the leading edge, is clearly indicated by the relative positions of the position indicator and the leading edge. It is therefore an easy task to mount the heating element exactly at the specified surface area.

In an aspect, the heating element includes a heating layer made of a carbon fiber material. The heating layer may be a textile material such as a fabric, including a non-crimp fabric. The carbon fibers may be oriented unidirectionally along a longitudinal direction of the heating element but may also be arranged in different orientations such as for example in a bi-axial or tri-axial fabric.

In an aspect, the heating element includes a carrier layer and a heating conductor fastened to the carrier layer. In this aspect, the carrier layer may correspond to the specified surface area and may provide the required stability for handling of the heating element. The heating conductor is fastened to the carrier layer so that the heating element can be mounted to the specified surface area essentially in one step. When mounting the heating element to the specified surface area, the heating conductor will be arranged in a predetermined position so that the distribution of heating power corresponds to the specification. A plurality of heating conductors can be used on the heating element. For example, a single heating conductor may be arranged in a meandering pattern on the carrier layer so as to distribute the heating power over substantially the entire specified surface area. In an alternative aspect, a plurality of heating conductors may be connected to the two electrical connectors in parallel and can be fastened to the carrier layer such that each of the heating conductors covers a defined partial area of the heating element.

In an aspect, the carrier layer includes a fiber mesh. For this mesh, for example glass fibers may be used, but also any other fibers providing the required stability. Preferably, the fibers are electrically insulating fibers so that the heating current will flow in a defined manner exclusively through the heating conductor. A fiber mesh provides the required stability and shear stiffness helpful for handling of the heating element at low weight. A fiber mesh can also be mounted to the wind turbine rotor blade using proven technology such as lamination and/or vacuum infusion of a resin.

In an aspect, the heating conductor is mounted to a carrier layer by stitching. For the stitching process, a yarn having a sufficient heat resistance can be used, for example polyester or aramid.

In an aspect, the position indicator includes a yarn connected to the heating element by stitching. In this manner, a reliable position indicator can be provided to the heating element at low cost.

In an aspect, the position indicator includes a plurality of stitched yarn lines arranged in parallel. In particular when a thin yarn is used, this helps to obtain good visibility of the position indicator. In particular, the plurality of stitched yarn lines together forms a strip having a width which is less than a mesh size of the fiber mesh of the carrier layer, wherein the strip in the direction of its width is arranged within a single mesh. This allows to obtain and to maintain a precise position of the position indicator on the heating element.

In an aspect, the yarn of the position indicator has a color which is different from a color of the carrier layer and/or different from a color of the heating conductor and/or different from a color of any other yarns used on the heating element. This helps to easily identify the position indicator visually, even if the heating element has a complex structure with numerous stitching lines related to the fastening of the heating conductor to the carrier layer. A particularly preferred color scheme is using a red yarn for the position indicator which is clearly visible on the heating element and also provides a good contrast against a background formed by a laminate of the wind turbine rotor blade, which typically has a green color.

In an aspect, the heating element has a length and a width, wherein the two connectors are arranged near opposite edges of the heating element running in the width direction, and wherein the position indicator indicates a line in the width direction. This configuration is particularly suitable for heating elements to be connected to supply lines running along a longitudinal direction of the wind turbine rotor blade, one on a pressure side, the other one on a suction side of the wind turbine rotor blade. The overall shape of the heating element may be rectangular or trapezoidal, wherein the edges may also include some curvature.

In an aspect, the line indicated by the position indicator is arranged at a predetermined length position. This may correspond to a midpoint of the heating element, but an asymmetric configuration is also possible, for example when the surface area to be heated on the suction side, measured from the leading edge, is longer than the surface area to be heated on the pressure side, or vice versa.

In an aspect, the heating conductor includes a metal heating wire. The cross-section of the metal heating wire and the electrical resistance of the selected metal can be selected such as to provide the required heating power at a given supply voltage.

In an aspect, the heating conductor includes a bundle of carbon fibers. The bundle of carbon fibers may be a fiber roving. The cross-section may be selected to provide the required electrical properties.

In an aspect, the fiber mesh has a mesh size in a range of 1 mm to 10 mm. In particular, the mesh size may be in a range of 2 mm to 6 mm. This is a good compromise between stiffness and weight. Moreover, this mesh size is also helpful to obtain the desired precision of the positioning of the position indicator and of the arrangement of a heating conductor fastened to the fiber mesh, in particular when the position indicator and the fastening is carried out by stitching.

The disclosure is also directed to a heating system including a set of heating elements, wherein the heating elements are adapted to be placed on a wind turbine rotor blade side-by-side, wherein at least some of the geometries of the heating elements are different from one another. By such a heating system, the entire surface area of the wind turbine rotor blades that shall be heated can be covered by a specific set of heating elements.

The disclosure is also directed to a wind turbine rotor blade, wherein the wind turbine rotor blade has an outer surface and a leading edge, wherein each heating element is installed on the outer surface such that its position indicator is aligned with the leading edge. For installing the heating elements to the outer surface, the heating elements can be aligned with the leading edge of the wind turbine rotor blade relying on the individual position indicators. Then, the heating elements are fastened to the outer surface, for example by gluing and/or via a vacuum infusion process.

BRIEF DESCRIPTION OF DRAWINGS

The invention will now be described with reference to the drawings wherein.

DETAILED DESCRIPTION

Figure 1:
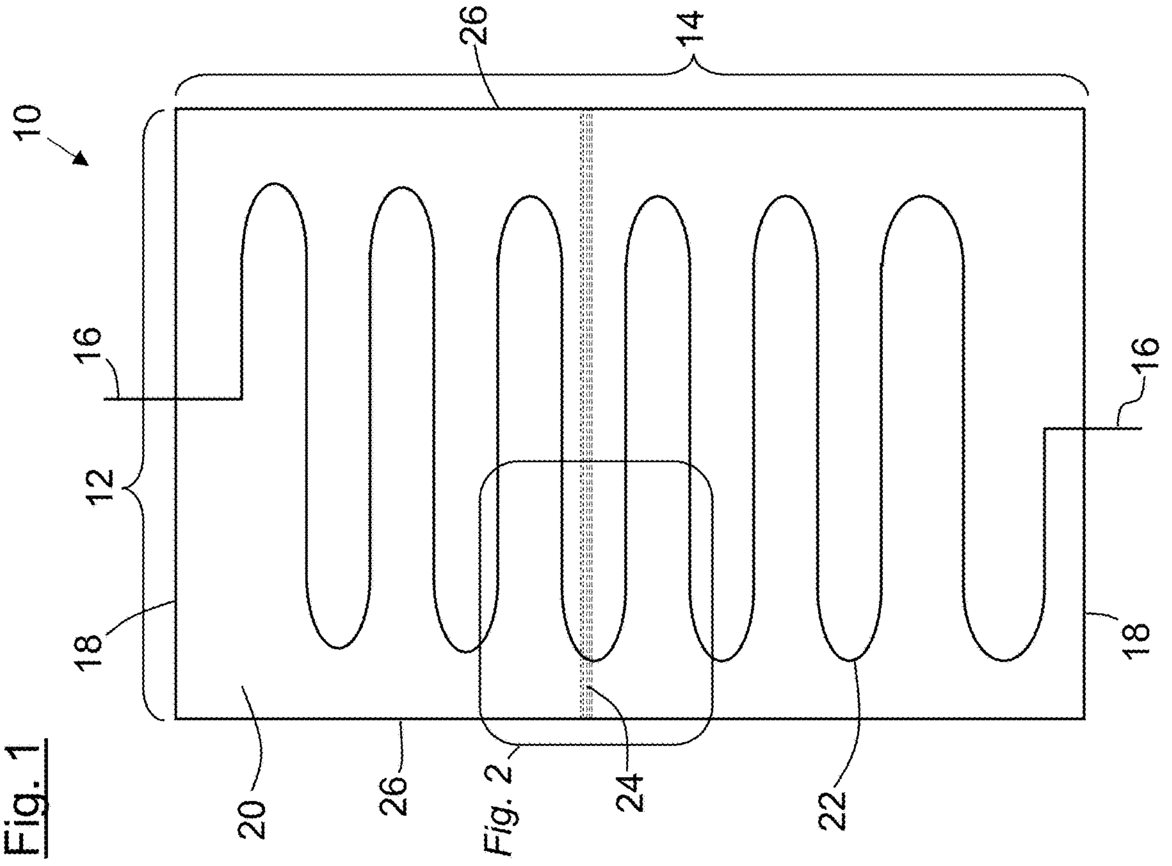
FIG. 1 shows a heating element in a schematic view.

The heating element 10 of FIG. 1 has a geometry defined by a width 12 and a length 14. Two electrical connectors 16 are arranged near opposite edges 18 of the heating element 10 running in the width direction. Along the length direction, the heating element 10 has two longitudinal edges 26.

The heating element 10 includes a carrier layer 20 having the defined geometry and a heating conductor 22 fastened to the carrier layer 20. The heating conductor 22 is arranged in a meandering pattern on the carrier layer 20 so that when the heating element 10 is mounted to a wind turbine rotor blade, substantially the entire surface area of the wind turbine rotor blade covered by the heating element 10 is provided with adequate heating power.

The heating element 10 further includes a position indicator 24 which forms a line over the width of the heating element 10. The line is arranged in the width direction.

The heating conductor 22 is formed by a metal heating wire. Each of the two ends of the heating conductor 22 are provided with one of the electrical connectors 16.

Figure 2:
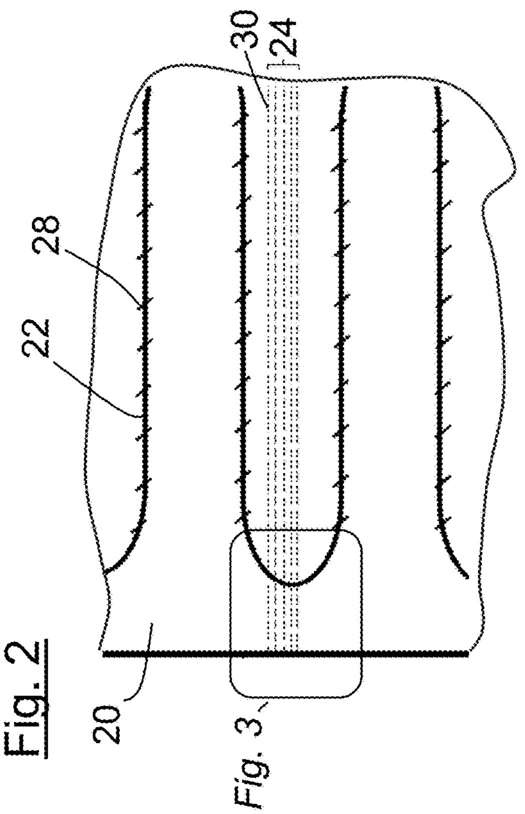
FIG. 2 shows an enlarged section of FIG. 1.

Further details of the heating element 10 will be explained with reference to the enlarged sections shown in FIGS. 2 and 3. In FIG. 2, one can see the heating conductor 22 is fastened to a carrier layer 20 by various stitches 28 carried out with a first yarn. The position indicator 24 includes a plurality of stitched yarn lines 30 arranged in parallel. These stitched yarn lines are carried out with a second yarn having a different color than the first yarn. The second color also differs from a color of the heating conductor 22 and from a color of the carrier layer 20. Carrying out the stitching of the yarn lines 30 does not interfere with stitching of the heating conductor 22 to the carrier layer 20. The yarn lines 30 may be stitched before or after the heating conductor 22 is fastened to the carrier layer 20.

Figure 3:
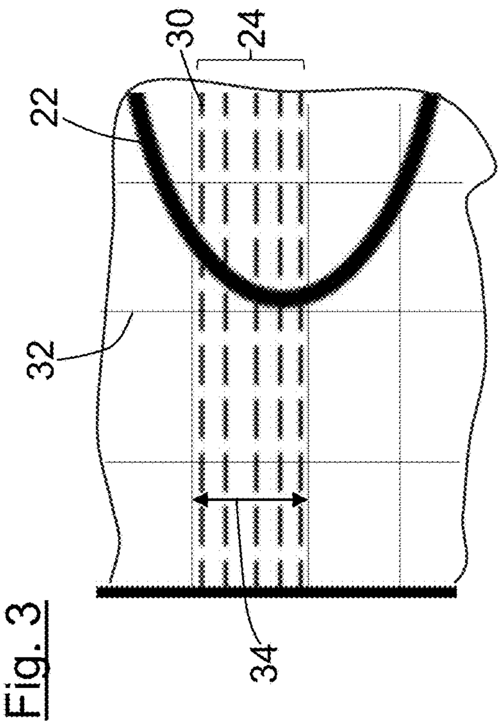
FIG. 3 shows an enlarged section of FIG. 2.

The further enlargement shown in FIG. 3 shows the internal structure of the carrier layer 20 which is formed by a fiber mesh of glass fibers 32 arranged in a rectangular pattern. A mesh size 34 of the fiber mesh is about 5 mm. One can see that all of the plurality of stitched yarn lines 30 are placed within one mesh. In other words, the plurality of stitched yarn lines 30 together form a strip having a width which is equal to or less than the mesh size 34.

Figure 4:
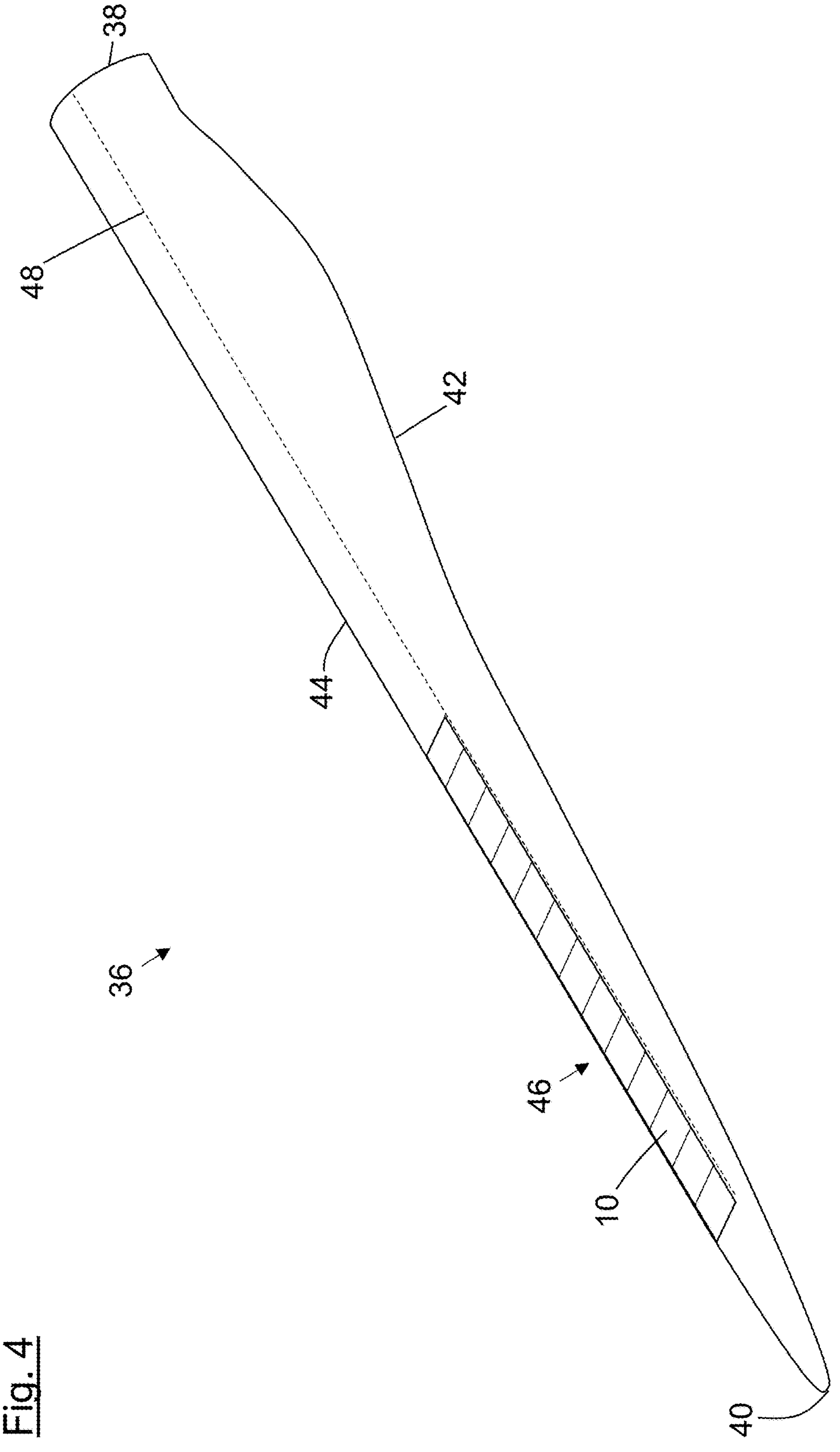
FIG. 4 shows a wind turbine rotor blade in a perspective view.

The wind turbine rotor blade 36 shown in FIG. 4 has a blade root 38, a blade tip 40, a trailing edge 42 and a leading edge 44. Along a section of the leading edge 44, which section extends from near the blade tip 40 towards a central point nearer to the blade root over a substantial part of the wind turbine rotor blade length, a heating system 46 including a plurality of heating elements 10 is arranged. The heating elements 10 are arranged side-by-side. The heating elements 10 are connected via the electrical connectors 16 (not shown in FIG. 4) to first and second supply lines 48 running along the wind turbine rotor blade length and ending at the blade root 38.

Figure 5:
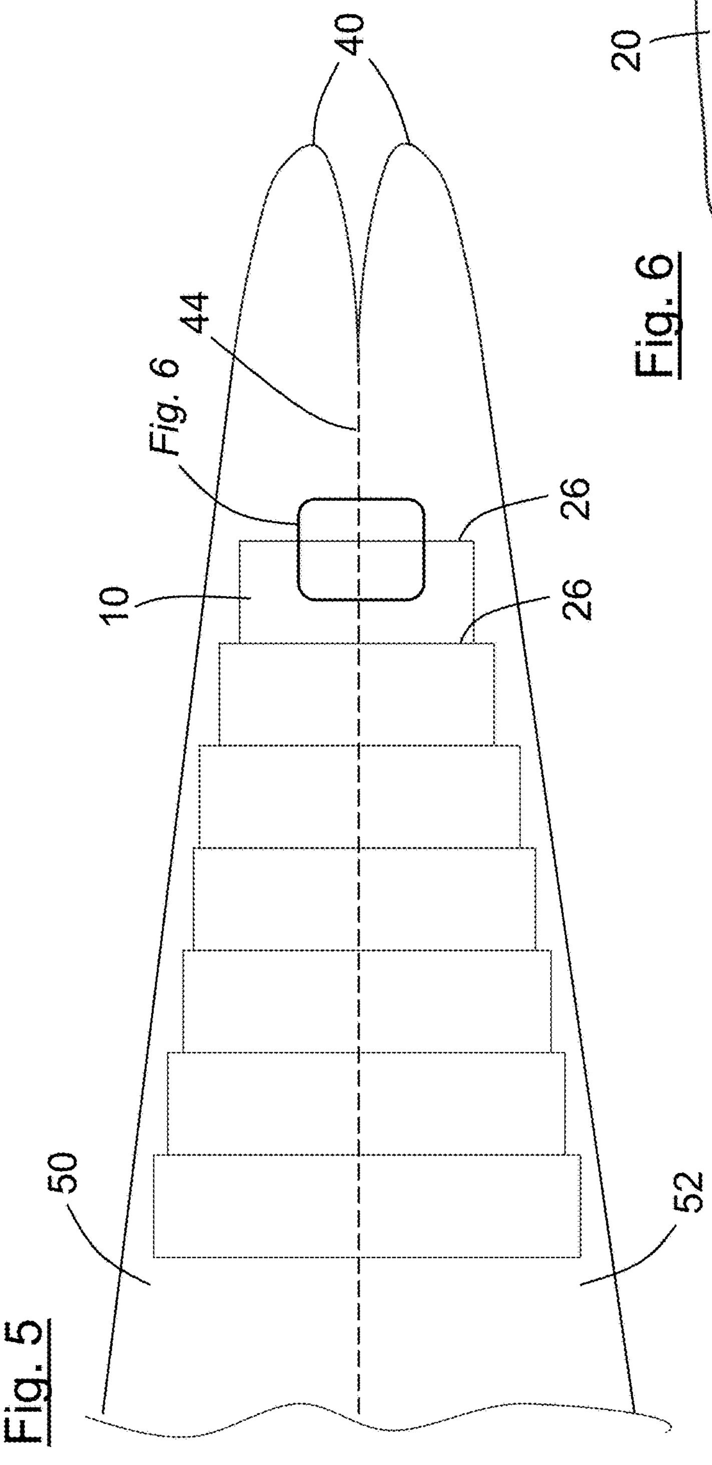
FIG. 5 shows a section of a wind turbine rotor blade in a schematic view; and, FIG. 6 shows an enlarged section of FIG. 5.

FIG. 5 shows a section of a wind turbine rotor blade 36 in a schematic view on the leading edge 44, whereas two half shells 50, 52 are shown unfolded so that one can appreciate the arrangement of the heating elements 10. One can also see that the heating elements 10 have different geometries, each being approximately rectangular, and that the heating elements 10 are arranged side-by-side, with the longitudinal edges 26 of neighboring heating elements 10 abutting one another.

Figure 6:
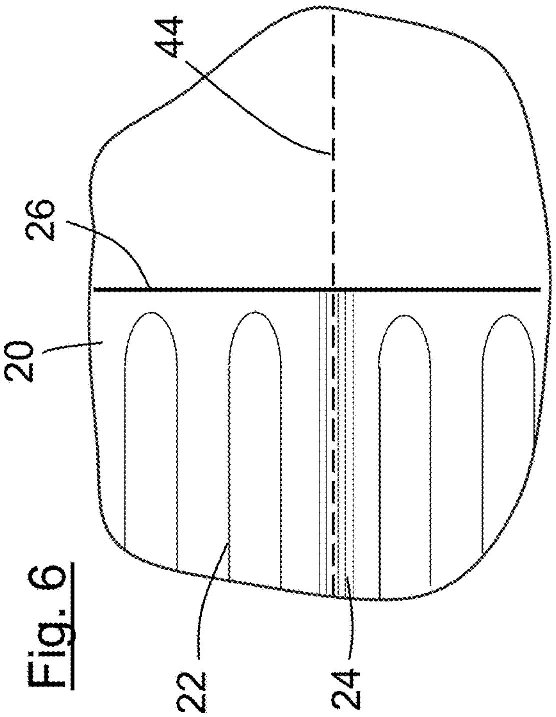

The enlarged view of FIG. 6 shows the heating element 10 arranged closest to the blade tip 40 in greater detail. One can see the carrier layer 20 and the heating conductor 22 fastened thereto. The position indicator 24 is aligned with the leading edge 44 of the wind turbine rotor blade 36.

It is understood that the foregoing description is that of the preferred embodiments of the invention and that various changes and modifications may be made thereto without departing from the spirit and scope of the invention as defined in the appended claims.

LIST OF REFERENCE NUMERALS

10 heating element
12 width
14 length
16 electrical connector
18 edge
20 carrier layer
22 heating conductor
24 position indicator
26 edge
28 stitch
30 stitched yarn line
32 glass fibers
34 mesh size
36 wind turbine rotor blade
38 blade root
40 blade tip
42 trailing edge
44 leading edge
46 heating system
48 supply line
50 half shell
52 half shell

The invention claimed is:

1. A heating element for a wind turbine rotor blade, the heating element comprising:

two electrical connectors configured to be connected to electrical supply lines of the wind turbine rotor blade;

a defined geometry configured to be arranged on a specified surface area of the wind turbine rotor blade; and, said heating element being provided with a position indicator configured to be aligned with a leading edge of the wind turbine rotor blade, wherein said position indicator includes a yarn connected to said heating element by stitching.

2. The heating element of claim 1 further comprising a heating layer made of a carbon fiber material.

3. The heating element of claim 1, wherein said heating element includes a carrier layer and a heating conductor fastened to said carrier layer.

4. The heating element of claim 3, wherein said carrier layer includes a fiber mesh.

5. The heating element of claim 4, wherein said fiber mesh has a mesh size in a range of 1 millimeter to 10 millimeters.

6. The heating element of claim 3, wherein said heating conductor is mounted to said carrier layer by stitching.

7. The heating element of claim 3, wherein said heating conductor includes a metal heating wire.

8. The heating element of claim 3, wherein said heating conductor includes a bundle of carbon fibers.

9. The heating element of claim 1, wherein said position indicator includes a plurality of stitched yarn lines arranged in parallel.

10. The heating element of claim 9, wherein said plurality of stitched yarn lines together form a strip having a width which is less than a mesh size of a fiber mesh; and, said strip in a direction of said width is arranged within a single mesh.

11. The heating element of claim 1, wherein said yarn of said position indicator has a color which is different from at least one of a color of said carrier layer, a color of said heating conductor, and a color of any other yarns used on said heating element.

12. The heating element of claim 1, wherein said heating element has a length and a width; said two electrical connectors are arranged near opposite edges of said heating element running in a width direction; and, said position indicator indicates a line in the width direction.

13. The heating element of claim 12, wherein the line indicated by said position indicator is arranged at a predetermined length position.

14. A heating system comprising:

a set of heating elements;

each heating element of said set of heating elements including two electrical connectors configured to be connected to electrical supply lines of a wind turbine rotor blade, each heating element of said set of heating elements further including a defined geometry configured to be arranged on a specified surface area of the wind turbine rotor blade;

each of said heating elements being provided with a position indicator configured to be aligned with a leading edge of the wind turbine rotor blade; and, each of said heating elements being configured to be placed on the wind turbine rotor blade side by side, wherein at least some of said defined geometries of said heating elements are different from one another, wherein said position indicator includes a yarn connected to said heating element by stitching.

15. A wind turbine rotor blade comprising:

a wind turbine rotor blade body having an outer surface and a leading edge;

a heating system including a set of heating elements;

each heating element of said set of heating elements including two electrical connectors configured to be connected to electrical supply lines of the wind turbine rotor blade, each heating element of said set of heating elements further including a defined geometry configured to be arranged on a specified surface area of said wind turbine rotor blade body;

each of said heating elements being provided with a position indicator;

each of said heating elements being configured to be placed on said wind turbine rotor blade body side by side, wherein at least some of said defined geometries of said heating elements are different from one another; and, each heating element of said set of heating elements being installed on said outer surface such that said position indicator is aligned with said leading edge, wherein said position indicator includes a yarn connected to said heating element by stitching.

* * * * *